United States Patent [19]

Haylett et al.

[11] Patent Number: 4,463,434

[45] Date of Patent: Jul. 31, 1984

[54] DIGITAL PHASE SHIFT CIRCUIT SIGNAL GENERATOR FOR RIP DETECTORS

[75] Inventors: Lyle M. Haylett, Mantua; Robert J. Houck, Akron, both of Ohio; Kevin J. King, Deerwood, Minn.

[73] Assignee: The B. F. Goodrich Company, New York, N.Y.

[21] Appl. No.: 288,882

[22] Filed: Jul. 31, 1981

[51] Int. Cl.³ .................. G06F 15/46; G08B 21/00
[52] U.S. Cl. .................. 364/507; 364/551; 364/484; 198/856
[58] Field of Search ............... 364/507, 551, 550, 468, 364/484, 487, 719, 480; 328/155; 198/856, 502; 329/162, 137

[56] References Cited

U.S. PATENT DOCUMENTS

| | | | |
|---|---|---|---|
| 3,792,459 | 2/1974 | Snyder | 198/856 X |
| 3,835,397 | 9/1974 | D'Antonio | 328/155 |
| 3,889,186 | 6/1975 | Larson | 328/155 X |
| 3,997,772 | 12/1976 | Crochiere et al. | 328/155 X |
| 4,035,735 | 7/1977 | Akashi et al. | 328/155 X |
| 4,180,778 | 12/1979 | Worthington | 328/155 |
| 4,228,513 | 10/1980 | Doljack | 364/468 X |
| 4,246,654 | 1/1981 | Maim | 364/484 X |
| 4,345,211 | 8/1982 | Longworth | 328/155 X |
| 4,349,883 | 9/1982 | Doljack | 198/856 X |

*Primary Examiner*—Edward J. Wise
*Attorney, Agent, or Firm*—Maky, Renner, Otto & Boisselle

[57] ABSTRACT

A circuit for generating plural AC signals, at least two of which may be relatively shifted in phase by a selected amount, includes a frequency divider for dividing the frequency of an AC input signal to derive a first AC signal at a relatively reduced second frequency, and a digital phase shifter responsive to the progress of the frequency divider for producing a second AC signal shifted in phase a selected amount from such first AC signal. The circuit is especially suited for use in a conveyor belt rip detector in which input and output coupling means couple an AC transmitter signal to antennas carried by the conveyor belt and receive an AC transmitter signal transmitted by respective antennas, and a detector monitors such AC signals received by said output coupling means and an AC reference signal to detect the integrity of the conveyor belt, for the circuit of the invention may be used to generate such AC signal and such reference signal relatively shifted in phase by a selected amount.

Synchronous demodulation using a lock in amplifier technique may be employed effectively to improve substantially the signal to noise ratio and/or signal discernment in the rip detector. The invention lends itself to computer control and self diagnosis of faults of the rip detector by use of the AC transmitter and reference signals and an AC test signal, also produced by the noted circuit.

19 Claims, 8 Drawing Figures

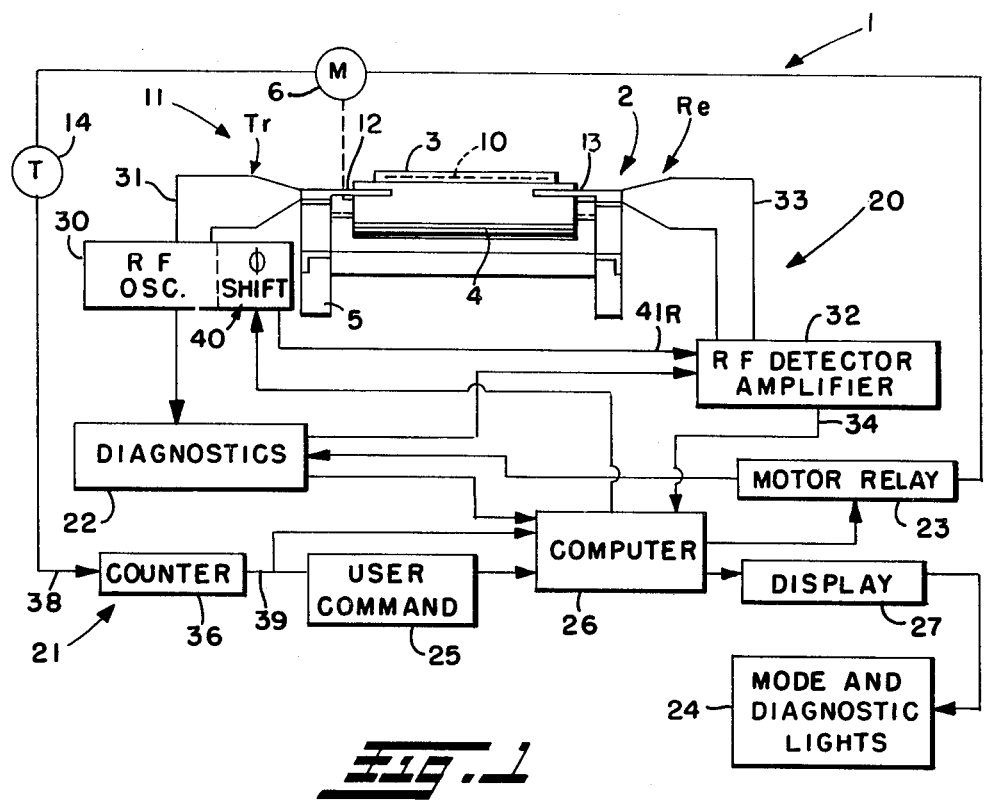
_Fig. 1_
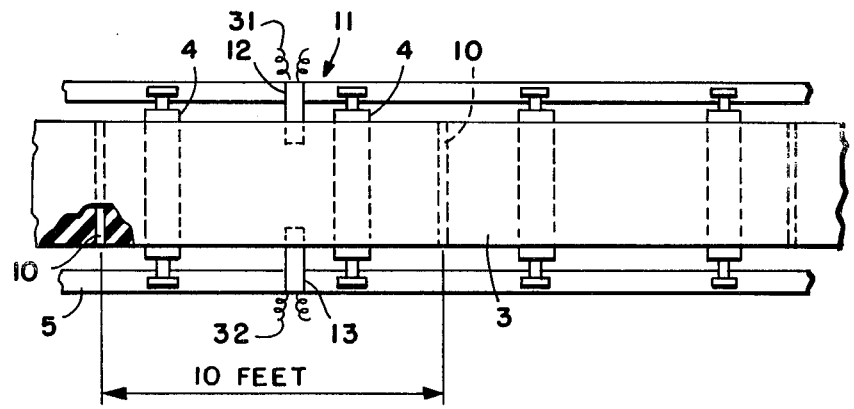
_Fig. 2_

DIGITAL PHASE SHIFT CIRCUIT SIGNAL GENERATOR FOR RIP DETECTORS

TECHNICAL FIELD

The present invention relates to AC signal generators and, more particularly, to an improved digital phase shift circuit signal generator especially useful in conveyor belt rip detectors.

BACKGROUND

In large endless non-metallic conveyor belts, which may have metal reinforcing cables therein, used to convey bulk material, there is a possibility of encountering a rip in the belt, for example, by a sharp object dropped thereon at the loading station. It is desirable promptly to detect such rips and, preferably, to shut down the conveyor belt upon such detection, thereby minimizing damage to the belt. One such conveyor belt rip detector is disclosed in U.S. Pat. No. 3,792,459. In such rip detector plural antennas, which may be single electrical conductors, are embedded in the belt transversely to its length at spaced-apart locations in the belt. An electrical signal is coupled by respective antennas from a transmitter to a receiver as the belt moves and the respective antennas pass in capacitive coupling relation with the transmitter and receiver at a rip detector station, and the receiver thus delivers an input signal to detector circuitry which interprets the same as an indication of satisfactory belt integrity. However, a broken antenna, for example at a place where the belt has been ripped, will not couple the transmitter signal through to the receiver, and the detector then senses the same as an indication of the occurrence of a rip condition. The detector circuit in such patent is operative after the lapse of a predetermined time period corresponding to the passage of a given number of broken antennas past the rip detector station to produce a distinguishable output that activates an alarm and/or deactivates the conveyor belt drive.

A number of improvements for use in conveyor belt rip detectors are disclosed in U.S. Pat. No. 4,228,513. One of such improvements includes a means for detecting the progress of the conveyor belt to know when an antenna should be at the rip detector station. If there is no antenna present then, a prompt shutdown of the conveyor belt drive may be effected.

Wear, stretching, contraction, dirt, other environmental conditions, etc. may cause a variation in the efficiency of signal coupling, whether of the capacitive, inductive, optical, or any other type of coupling, between the antennas (or other signal coupling means carried by the belt) and the transmitter and the receiver at a rip detector station. Such efficiency variation will vary the magnitude or other parameter of the input signal delivered from the receiver to the detector, which may detrimentally affect operation of the entire system.

Thus, it would be desirable to provide signal information to the detector at a relatively accurately controlled magnitude (or other parameter). In copending, commonly assigned U.S. patent application Ser. No. 126,218, filed Mar. 3, 1980, now U.S. Pat. No. 4,349,883, issued Sept. 14, 1982, such magnitude control is effected digitally, step-wise and efficiently. An improved antenna detection technique and provisions to avoid nuisance shut downs of the conveyor belt also is disclosed in commonly assigned U.S. patent application Ser. No. 133,595 filed Mar. 24, 1980.

It has been discovered, as has been described in commonly assigned copending U.S. patent application Ser. No. 275,969, filed June 22, 1981, for "Signal to Noise Ratio Improvement for Rip Detectors" that in some operational environments of conveyor belt rip detectors the electrical noise is so great that the poor signal to noise ratio significantly decreases the accuracy of the rip detector function. Moreover, and very importantly, it has been discovered that in a conveyor belt that carries antennas intended for capacitive coupling with the transmitter and receiver at a rip detector station, much of the electrical noise introduced to the receiver is derived from cross coupling, primarily of a capacitive nature, between the capacitive probes of the transmitter and receiver via the belt itself and/or apparatus associated therewith, such as the rollers, drive wheels, support frame, etc. In connection with such discovery, an equivalent electric circuit model of the transmitter/belt/receiver connection has been developed and used to determine an efficient technique for improving signal to noise ratio even in extremely electrically noisy environments. In accordance with the invention of such application, and in opposite contrast to what ordinarily would be expected, the signal to noise ratio is improved by reducing the frequency of the AC signal ordinarily used in a rip detector system in which the transmitter and receiver are capacitively coupled to antennas sequentially carried past the rip detector station by a conveyor belt. The equivalent circuit model has been found to include between the two input and output probe capacitors a finite resistance of the antenna itself and a cross coupling capacitance operating in parallel with such antenna resistance.

In each of the above patents and applications diode detectors are used in the receiver to convert the modulated AC transmitter signal to DC pulses representing passage of integral antennas past the rip detector station. Such diode detectors, even with associated conventional filters, may be unsatisfactory to distinguish the antenna pulses from the noise in particularly electrically noisy environments.

The magnitude of the electrical noise signal in a conveyor belt rip detector often approaches the magnitude of the transmitter signal; and, therefore, it is quite difficult to sense a received transmitter signal with accuracy, especially in particularly electrically noisy environments in which conveyor belt rip detectors often are found.

The electrical noise problem becomes all the more acute in rip detector systems because there usually must be at least one or two signal couplings by non-contacting means, for example, capacitive or inductive coupling. (The invention will be described in detail below with respect to use of a capacitive coupling technique, vis-a-vis the coupling of the AC transmitter signal to an antenna carried by a conveyor belt and coupling of the transmitter signal from the antenna to the receiver. However, it is believed that the features of the invention may be used when other types of rip detector signal couplings are employed, such as the noted inductive coupling.)

In the typical prior rip detector, the periodic coupling and non-coupling of an AC carrier signal (the AC transmitter signal), is a function of whether or not an antenna is present at the rip detector station; and such periodic coupling may be considered modulation of the transmitter AC carrier signal. The poor signal to noise ratio often occurring, however, may make it difficult to discern whether or not a rip has occurred, and this, of course, would reduce the effectiveness of the rip detector.

One technique used for noise filtering or signal to noise ratio improvement is known as the lock in amplifier, a disclosure of which is presented in "Optimization of Electronic Measurements" by Howard Malmstadt, et al. (W. A. Benjamin Publishers, Menlo Park, Calif., at pages 118-125. Prior use of lock in amplifiers, however, has been generally restricted to laboratory environments, such as with the spectrophotometric measuring equipment in the Malmstadt publication. Moreover, to use effectively a lock in amplifier, it is necessary that a modulated AC carrier signal and a reference AC signal be substantially in phase with each other to achieve desired synchronous demodulation. Therefore, as is described by Malstadt, phase adjustment may be provided for the reference AC signal.

In commonly assigned, concurrently filed U.S. patent application Ser. No. 288,883 for "Improved Demodulation Technique for Rip Detector Signals" there is disclosed a lock in amplifier technique that enables synchronous demodulation of signals occurring in a rip detector. In that application is disclosed the discovery that the received AC transmitter signal, i.e. the AC transmitter signal received by the receiver or detector-amplifier from an antenna, may be shifted in phase from the transmitted AC transmitter signal, i.e. the AC transmitter signal transmitted by the transmitter for coupling to an antenna. That phase shift may be variable in a single conveyor belt rip detector system and also may vary from system to system. To use such lock in amplifier demodulation, then, it is necessary to shift the phase of the demodulating or reference signal.

The entire disclosures of the above mentioned patent, applications and reference are hereby incorporated by reference.

SUMMARY OF INVENTION

The present invention relates to a means accurately to adjust and to control the relative phase shift between such transmitted AC transmitter signal and a reference or demodulating signal so that the phase of the latter will be at least substantially the same as that of the received AC transmitter signal.

We have discovered and developed a number of improvements for use especially in conveyor belt rip detectors that enable computer or computer type monitoring and control by a rip detector with improved accuracy over prior rip detectors by employing synchronous demodulation and for use independently, as well, to develop plural signals that are relatively shifted in phase. The invention also facilitates computer controlled fault self-diagnosis by having the transmitter output not only an AC transmitter signal and an AC reference signal, but also a test signal representative of transmitter operation and that may be used to check receiver operation.

According to one aspect of the invention, a circuit for generating plural AC signals at least two of which may be relatively shifted in phase by a selected amount includes input means for receiving an AC input signal of a first frequency, frenquency divider means for dividing the frequency of such AC input signal to derive a first AC signal at a relatively reduced second frequency, and digital phase shifter means responsive to the progress of said frequency divider means for producing a second AC signal shifted in phase a selected amount from such first AC signal.

According to another aspect, there is provided for use in a conveyor belt rip detector including input and output coupling means for coupling an AC signal to antennas carried by the conveyor belt and for receiving an AC signal transmitted by respective antennas, and detector means for monitoring such AC signals received by said output coupling means and a reference signal to detect the integrity belt, an improvement of a circuit for generating such AC signal and such reference signal which may be relatively shifted in phase by a selected amount, including input means for receiving an AC input signal of a first frequency, frequency divider means for dividing the frequency of such AC input signal to derive a first AC signal, as one of such AC signal and reference signal, at a relatively reduced second frequency, and digital phase shifter means responsive to the progress of said frequency divider means for producing a second AC signal, as the other of such AC signal and reference signal, shifted in phase a selected amount from such first AC signal.

According to a further aspect, a circuit for shifting the phase of one signal relative to another signal includes first means for producing digital information directly coordinated with the instantaneous time frame development of such another signal, set means for setting a predetermined phase relation of such one signal relative to such another signal, comparator means responsive to such digital information and said set means for producing an output signal representative of the phase of such one signal, and output means responsive to such output signal for producing such one signal at a phase corresponding thereto.

With the foregoing in mind, a primary object of the invention is to improve conveyor belt rip detector apparatus, as is noted herein.

Another object is to improve the accuracy of conveyor belt rip detectors.

An additional object is to facilitate separating electrical signals from electrical noise, especially in a conveyor belt rip detector apparatus.

A further object is to enhance overall operation of conveyor belt rip detectors.

Another primary object is to provide a digital phase shift circuit that is improved in the noted respects.

Still another object is to facilitate shifting the phase of one signal relative to another.

Still an additional object is to maintain the accuracy of phase relation between plural AC signals.

Still a further object is to control shifting or non-shifting of the phase of an output signal produced by a phase shift circuit.

Even another object is to provide a technique for tuning a conveyor belt rip detector apparatus to minimize the effect of noise.

These and other objects and advantages of the present invention will become more apparent from the following description.

To the accomplishment of the foregoing and related ends, the invention, then, comprises the features hereinafter fully described in the specification and particularly pointed out in the claims, the following description and the annexed drawings setting forth in detail a certain illustrative embodiment of the invention, this being indicative however, of but one of the various ways in which the principles of the invention may be employed.

BRIEF DESCRIPTION OF THE DRAWINGS

In the annexed drawings:

FIG. 1 is a schematic system diagram of a conveyor belt system with which the conveyor belt rip detector monitor system of the present invention may be used;

FIG. 2 is a fragmentary top plan view schematically showing the conveyor belt, antennas therein, and a rip detector station;

FIG. 3A is a graphical presentation of a waveform of a signal occurring in the circuit of FIG. 3;

DETAILED DESCRIPTION OF INVENTION

Figure 3:
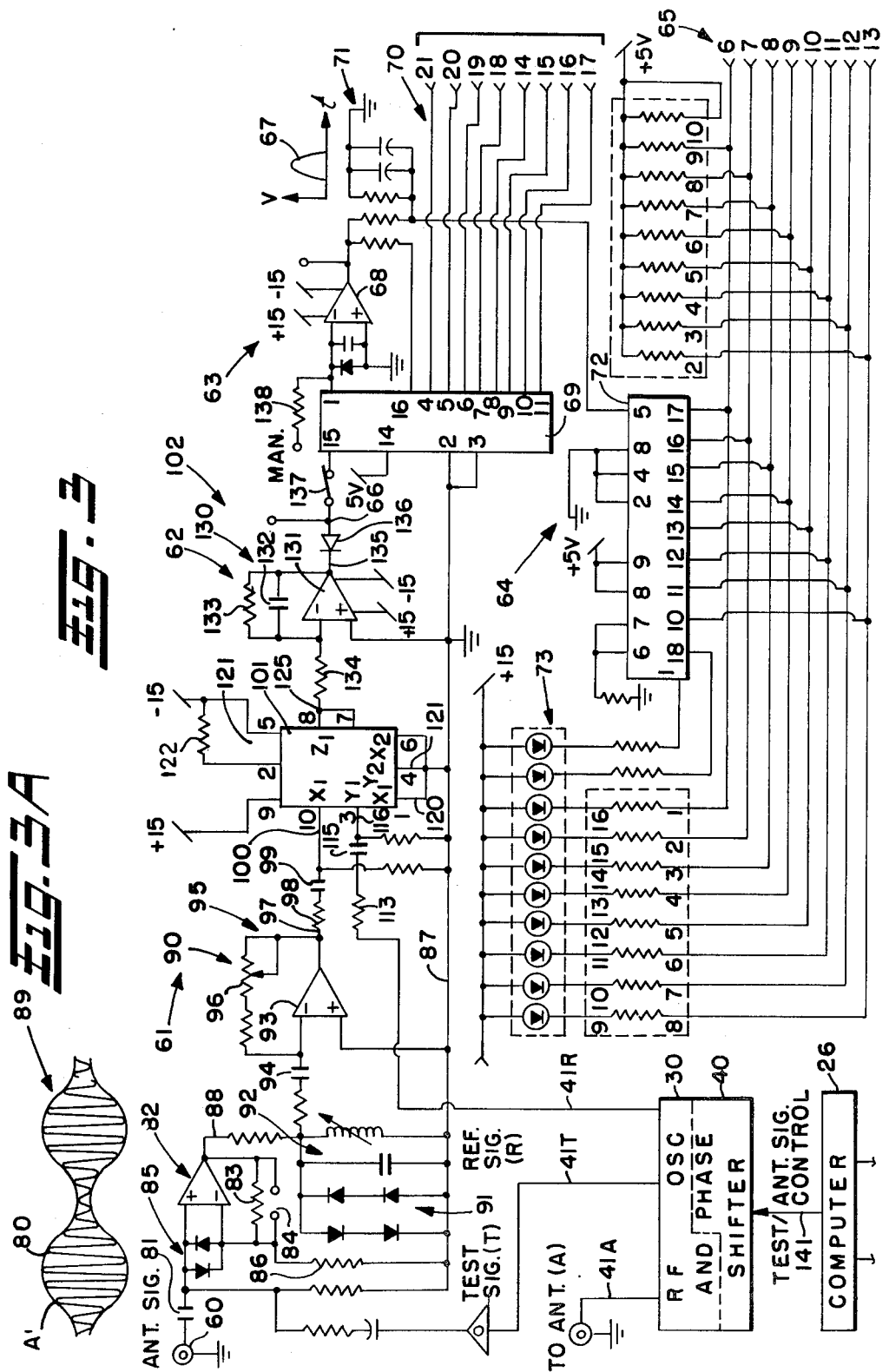
FIG. 3 is a schematic electric circuit diagram of a signal control circuit aparatus using the lock in amplifier of the invention.

Referring to FIGS. 1 and 2, a monitor system generally indicated at 1 is shown in association with a conveyor belt system 2 for detecting a rip, tear, or other similar flaw (hereinafter collectively "rip") in the conveyor belt 3. The belt 3, which may be a conventional endless, non-metallic conveyor belt, is supported by rollers 4 at longitudinal stations along a support frame 5 and is driven by a motor 6 which turns a drive roller.

The transducer technique for observing the structural integrity, or lack of the same, e.g. a rip, of the belt 3 uses a plurality of antennas 10 embedded in or otherwise carried by the belt generally transversely to the travel direction thereof and at a rip detector station 11 a transmitter plate 12 of a transmitter Tr and a receiver plate 13 of a receiver Re. Each antenna 10 may be a single electrical conductor of relatively small gauge, or other type of electrical conductor, such as a wire, a conductive fabric, or reinforced tire cord, which is most preferred, intended, when passing the station 11, capacitively to couple with the transmitter and receiver plates 12, 13 to couple an electrical signal therebetween. Such signal coupling indicates the structural integrity of the antenna and proximate portions of the belt 3; the lack of such signal coupling where it is expected to occur generally indicates a flaw, such as a break in the antenna and a rip in the proximate portion of the belt 3.

As the belt 3 progresses in its process of traveling along its length, the monitor system 1 continuously looks for the sequential cyclical occurrence of events, namely the passing of the respective antennas by the rip detector station 11. The monitor system 1 also particularly observes the progress of such process by monitoring the rotation of the motor 6 or drive roller with a conventional tachometer 14, and correlates such progress information with the detected event information to sense promptly when an event has been missed. Upon missing one or more events, the monitor system 1 may promptly stop the motor 6 to shut down the conveyor belt system 2 minimizing any rip damage to the belt 3.

The fundamental components of the monitor system 1 include an event detector 20, a progress detector 21, a diagnostics portion 22, a shut-down control portion 23, an output indicator portion 24, a user command portion 25, a comparator portion 26, such as a computer, and preferably a microcomputer, that stores and compares information received from the various portions of the monitor system and effects appropriate control in response to such information, and a display portion 27.

The event detector 20 is coupled to an event transducer including the transmitter and receiver plates 12, 13 for capacitive coupling to and through an antenna 10. The detector 20 includes an oscillator 30, which produces an AC electrical signal, preferably in the radio frequency range, for example, on the order of about 25 KHz. to less than about 200 KHz., delivered by an electrical connection 31 to the transmitter plate 12 (this is the transmitted transmitter or antenna signal A); and a detector amplifier 32 coupled to the receiver plate 13. The transmitter Tr includes the plate 12 and oscillator 30, and the receiver Re includes the plate 13 and detector amplifier 32. When an antenna 10 passes in proximity to the transmitter plate 12 such AC signal is capacitively coupled to the antenna and from the antenna to the receiver plate 13 (this is the received transmitter or antenna signal A') for delivery via an electrical connection 33 as an event signal to the detector-amplifier 32. The detector-amplifier 32 preferably is primarily responsive only to an event signal that has a frequency at least approximately equal to the AC signal produced by the oscillator 30; accordingly, the detector-amplifier 32 preferably is a radio frequency responsive device. Receipt of a proper event signal is communicated as an event detect signal by a connection 34 to the computer in the comparator portion 26.

Progress of the belt movement is detected by the progress detector 21, which includes the progress transducer tachometer 14 and a counter 36. The tachometer 14 produces in conventional manner a series or train of electrical pulses on line 38. The frequency of such pulse train preferably is directly proportional to the rotational speed of the motor 6 and, accordingly, directly proportionately represents the progress of the belt 3 as it is driven along its path. The counter 36 converts the serial pulse train information from the tachometer 14 to parallel binary data, such as a 16 bit binary number, the progress signal, which also directly represents progress of the belt 3 and is delivered on a bus 39 to the computer in comparator portion 26.

Briefly, in operation of the monitor system 1 observing the belt 3 to sense whether a rip has occurred, information concerning the relative interval distances between each pair of adjacent antennas is obtained and stored during one cycle of the belt 3. Using such information, the monitor system sequentially looks for each antenna at its expected position, within a tolerable window of error or offset. The relevant interval distance information is updated each time an antenna is detected. However, when an antenna is missed, i.e. it is not sensed at its expected position, the monitor system 1 stops the belt 3.

More particularly, the computer 26, when it receives an event detect signal on line 34, reads and stores the progress signal received on bus 39. When the next event detect signal is received, the computer 26 again reads and stores the progress signal received on the bus 39. The value of the difference between the two progress signals, then, represents the distance between the two adjacent antennas 10 that passed the rip detector station 11 to produce the two event detect signals. This procedure is repeated to obtain information concerning the distances between each pair of adjacent antennas. Such information is measured or detected and is stored, for example in a table, during a programming mode of operation of the monitor system 1. After the table has been completed with information concerning the distances between every pair of adjacent antennas, the monitor system 1 can operate in a rip detect mode. In the rip detect mode the computer 26 compares the progress signal received on bus 39 with the relevant value of information from the stored table to determine when an antenna 10 should be present at the rip detector station 11. If there is a whole antenna properly positioned at the rip detector station 11 in capacitive coupling relation with the transmitter and receiver plates 12, 13 at that time, meaning that the conveyor belt 3 also is whole, then the monitor system begins looking for the next antenna. However, if, when expected, there is no antenna present at the rip detector station 11 or the antenna then present is broken, indicating a conveyor belt system 2 fault or a belt rip, respectively, no event detect signal will be delivered to the computer 26; accordingly, the computer 26 promptly declares the event missing and may operate the start stop control portion 23 to stop the belt 3 in order to minimize any damage thereto.

Preferably the start stop control portion 23 is a relay that controls energization and de-energization of the motor 6 and/or a conventional clutch and braking system for the conveyor belt system 2. In the output indicator portion 24 plural mode lights and diagnostic lights, which are operated by the computer 26, indicate the operational mode of the monitor system 1 and the reason for any detected failure or shut-down of the conveyor belt system 2. The user command portion 25 may include a plurality of manually operated pushbutton controls or connections to receive electrical input control information from external equipment, such as a remote control panel, electronic control equipment, etc., to effect operational control of the monitor system.

The RF oscillator 30 has associated with it a digital phase shift circuit 40, which is controlled by the computer 26, to produce AC signals on lines 41A, 41T, and 41R; the signals on those lines all are AC signals having the same frequency but, perhaps, different phases, and those signals are identified, respectively, as an antenna signal A, a test signal T, and a reference signal R. Ordinarily, the reference and test signals are in phase, and the antenna signal is shifted in phase therefrom by an amount selected by the operator of the system 1.

The digital phase shift circuit 40 is described below with reference to FIG. 5.

The antenna signal A on line 41A is coupled to the transmitter plate 12. When an integral antenna is aligned at the rip detector station 11, it will couple the antenna signal to the receiver plate 13, which, in turn, is coupled by an input terminal 60 to a signal control circuit apparatus 61 of the detector amplifier 32. The antenna signal received at the input terminal 60 is pulse modulated increasing and decreasing in magnitude as an antenna approaches and leaves the detector station 11. Preferably no signal at the antenna signal frequency will be received by the receiver plate 13 when no antenna is proximate the same. However, it is possible, and in many cases quite likely, that electrical noise will be received at the receiver plate 13 and at terminal 60, whether or not any antenna is present at the rip detector station 11.

Moreover, and very importantly, as has been noted above, the phase of the received antenna signal A' received at the receiver plate 13 has been found to be shifted from the phase of the transmitted antenna signal A actually produced on line 41A.

The signal control circuit apparatus 61 includes a demodulator circuit 62, which receives the event or antenna signal A' information from the input terminal 60 and demodulates the same with respect to the reference signal received on line 41R to eliminate noise effect, and, particularly, to distinguish an antenna signal A' when it occurs at the input terminal 60; a changing means 63, which receives an input signal and produces an output signal at a predetermined magnitude in response to receipt of such input signal; and a control means 64 for controlling the changing means proportionally stepwise in response to the magnitude of at least one of the input and output signals.

The apparatus 61 also includes an output bus 65, which corresponds to the connection 34 of FIG. 1, to couple the output signal to the computer 26 for the above described purposes. The changing means 63, control means 64, and bus 65 are described in detail in copending, commonly assigned U.S. patent application here in Ser. No. 126,218, filed Mar. 3, 1980 now U.S. Pat. No. 4,349,883, issued Sept. 14, 1982. The portions 63-65 of the circuit apparatus 61 produce on the bus 65 parallel digital data representing the magnitude of a DC signal occurring at junction 66 at the output of the demodulator circuit 62. It is intended that the signal at junction 66 be a DC pulse-like signal, such as one of the waveform type shown at 67 at the output of an amplifier 68 each time an integral antenna passes the rip detector station 11. The circuit portions 63-65 respond to the pulse signal at junction 66 to produce ordinarily a digital representation thereof on the bus 65. To effect such operation, the changing means 63 includes the amplifier 68 and a resistance ladder network 69, which is controlled digitally by information received on a control bus 70 from the computer 26. A filter 71 filters the output from the amplifier 68, and analog to digital converter 72 converts the output from the filter and the amplifier to the digital information for application to the bus 65. Moreover, a display 73, that includes a plurality of light immitting diodes is operative to display functioning of the A/D converter 72 and the actual magnitude of the digital data produced on the bus 65.

In the preferred embodiment and best mode of the invention, the antenna, test and reference signals A, T and R have a frequency of 62.5 KHz. Such frequency is not an even number to avoid interference from other transmitters. The received antenna signal A' at input terminal 60, then, in effect is a carrier wave modulated by the presence or not of an integral antenna at the rip detector station 11. Thus, the magnitude of the signal A' will be approximately 0 when no antenna is present and will grow to a fairly large magnitude represented at 80 in FIG. 3 as an antenna passes through the rip detector station.

The modulated antenna signal A' received at input terminal 60 passes through an input capacitor 81 to a first amplifier stage 82 of relatively high gain. Such amplifier stage has a feedback resistor 83, which sets that gain and a pair of terminals 84 across which a further resistor may be connected to change the amplifier gain. Input diodes 85 provide voltage protection for the amplifier 82. The inverting input of the amplifier 82 is coupled by a resistor 86 to a source of ground reference potential 87 for the circuit apparatus 61. At the output 88 of the amplifier 82 is produced an amplified signal having a waveform similar to that shown at 89 in FIG. 3A.

Between the output 87 of the first amplifier stage 82 and a second amplifier stage 90, is connected a diode clipper circuit 91 to limit the voltage of the signals delivered to the second amplifier stage 90 preventing saturation of the latter. A convention passive band pass circuit or tank circuit 92 reduces noise coupled through to the second amplifier stage 90.

The second amplifier stage 90 includes an integrated circuit amplifier 93 which receives at its inverting input the signal from the tank circuit 92 via a high pass filter capacitor 94, which is intended to eliminate DC offsets. To control gain of the second amplifier stage 90 a feedback circuit 95 is provided, including an adjustable potentiometer 96 that may be set to adjust the gain to a desired level. The signal at the output 97 from the second amplifier stage 90 is an AC signal similar in form to the waveshape shown at 89 (FIG. 3A). An isolating resistor 98 and a high pass filter capacitor, which is intended to eliminate DC offsets, couple the output 97 to the input 100 of an analog multiplier integrated circuit 101. The analog multiplier 101 may be, for example, an Analog Devices integrated circuit model No. 534, the various pin terminal connections of which are illustrated in FIG. 3.

The analog multiplier 101 is used as the active element of a lock in amplifier. Such analog multiplier in cooperation with a low pass filter 102 coupled to its output effects synchronous demodulation of the received antenna signal A' with respect to the reference signal R, as will be described further below.

The reference signal R received on line 41R is coupled via an isolating resistor 113 and a capicitor high pass filter 115 for offset elimination to an input 116 of the analog multiplier 101. The phase shift of the reference signal R relative to the phase of the antenna signal A is such that the phase of the reference signal R is the same as the phase of the antenna signal A' as they are received at the inputs 100, 116 to the analog multiplier 101.

The analog multiplier 101 has an $X_2$ input terminal 120 which is coupled to the ground line 87. The $X_1$ input to the multiplier 101 is terminal 100, and the $Y_1$ terminal is input 116. Moreover, the $Y_2$ input terminal 121 and the $Z_2$ terminal are connected to ground. A gain resistor 122 determines the scale factor for the multiplier 101. Ordinarily the analog multiplier 101 will cause a zero voltage at terminal 125 when no antenna signal is received at input terminal 60.

Coupled to the output 125 of the analog multiplier 101 is an integrator 130 forming low pass filter 102 or other low pass filter device. The integrator 130 includes integrated circuit amplifier 131, integrating capacitor 132, feedback resistor 133, and input resistor 134. The input resistor 134 is connected to the inverting input of the amplifier 131 so that for a positive signal provided to such inverting input, there will be a negative signal produced at the output 135 of the amplifier. A diode 136 assures that any signal passing to the ladder network 69 will be a negative signal. A selectable switch 137, which is shown in the automatic mode, i.e. one that permits operation of the circuit portion 63 automatically to adjust the gain of the amplifier 68, may be thrown to a manual position whereby a fixed resistor 138 is connected to the feedback path for the amplifier 68 to eliminate the automatic gain feature of ladder network 69.

Operation of the demodulator circuit 62 will be described now. The analog multiplier 101 functions constantly to provide a signal P at its output 125 that is a function of the instantaneous magnitudes of the signals provided to the input terminals thereof. More specifically, the instantaneous magnitude of the signal P is defined according to the following equation $P=(X_1-X_2)\times(Y_1-Y_2)\div$ scale factor.

The magnitudes of the values $X_1$, $X_2$, $Y_1$, and $Y_2$ are those at the respective inputs to the analog multiplier shown in FIG. 3. The reason for dividing the equation by the scale factor is to keep the product within a suitable range of magnitudes so as not to drive any portion of the demodulator circuit 62 into unwieldy saturation.

Summarizing the effect of the demodulator 62, when there is an antenna 10 present at the rip detector station 11, there will be produced at the $X_1$ and $Y_1$ terminals of the analog multiplier 101 respective AC signals that are of the same frequency and in phase with each other. The product of the various positive and negative peaks of such AC signals will be a series of positive pulses appearing at the output 125. Those positive pulses will be integrated by the integrator 130 and will appear as a substantially continuous negative pulse at the output 135 thereof being used as an output, then, to the circuit 63. The duration of such continuous negative pulse will be a function of the time required for the antenna 10 to pass the rip detector station 11.

On the other hand, when there is no antenna signal A' received at input terminal 60, although there may be a substantial amount of electrical noise received there or, in any event, provided the input terminal 100 of the analog multiplier 101, the effect of the demodulator circuit 62 will be to filter out or eliminate such noise. Such electrical noise is usually random and, in particular, totally unrelated to the frequency and phase of the reference signal received at terminal 116. Therefore, the product of the electrical noise signal and the reference signal will be positive *and* negative voltages that ordinarily average out to a DC signal value, being a composite of positive and negative pulses that really will not have any substantial influence on the zero level output of the integrator 130. Moreover, by adjustment of the potentiometer 124 the centering of such DC signal value about zero volts can be substantially achieved so that the low pass filter 102 will produce a zero output on line 135.

In view of the foregoing, it will be clear that the demodulator circuit 62 effectively eliminates the influence of random electrical noise on the antenna signal A' so that such antenna signals can be accurately discerned and used to provide an input to the remaining portions 63, 64 of the circuit apparatus 61. Furthermore, by shifting the phase of the reference signal R will respect to the antenna signal A so that the phases of the reference signal and the received antenna signal A' are the same, the demodulator 62 can be used in a highly effective manner for a conveyor belt rip detector.

To facilitate setting up the circuit apparatus 61 and to test operability of the receiver Re, a test signal T is provided selectively via line 41T to the input of the demodulator circuit 62, specifically at the first amplifier stage 82 thereof. Such test signal is in phase with and at the same frequency as the reference signal R so that the multiplier 101 will be effective to produce as its output signal a plurality of only positive pulses representing the product of the signals R and T. The test signal T should not be produced at the same time and an antenna signal A' may be received at the input terminal 60 when the monitor system 1 is checking for rips, and for that purpose the signal output and switching circuit 140 of FIG. 4 effects appropriate control.

Figure 4:
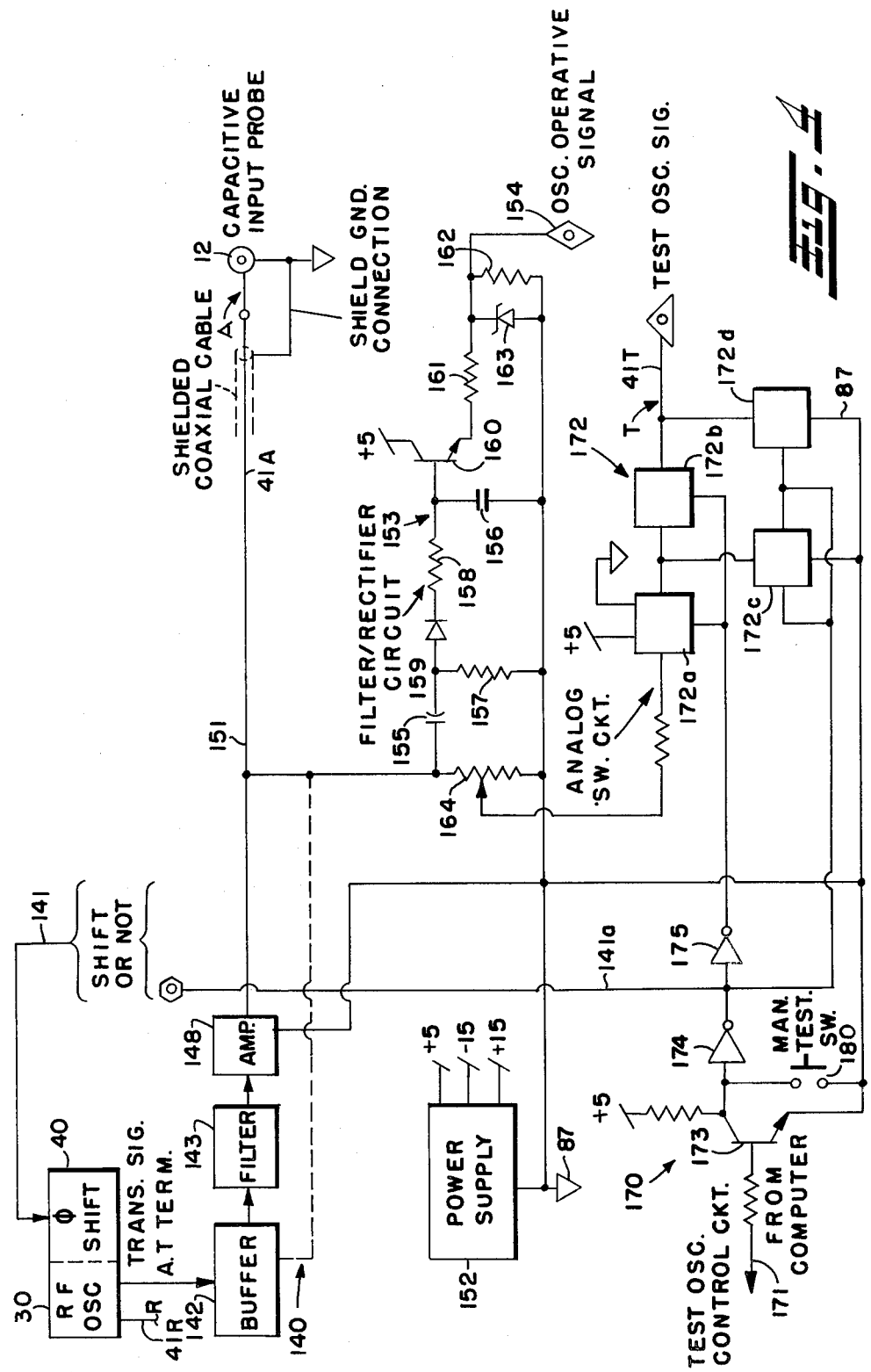
FIG. 4 is a schematic electric circuit diagram of a signal output and switching circuit of the invention.

Turning now to FIG. 4, the signal output and switching circuit 140 is shown in detail. The oscillator 30 provides to the phase shift circuit 40 a constant frequency AC signal. The phase shift circuit 40 includes means responsive to shift control signals provided on line or lines 141 by the computer 26 and delivers on line 142 an AC signal that is of one phase or another shifted from the first.

The AC signal on line 142 is provided to a buffer amplifier stage 143, a filter 144 and a power amplifier stage 148. In response to the AC signal delivered to line 142, there will be an AC signal produced at the output 151 of the amplifier 148 to produce the antenna signal A at the capacitive probe or transmitter plate 12 for coupling to respective antennas carried passed the rip detector station 11. Dash line 151a represents the possibility that the buffer 142 could be connected to the circuits 153, 172 instead of line 151.

A conventional power supply 152 provides DC power, as is indicated, to the various portions of the signal to switching circuit 140 (FIG. 4) and to the various portions of the signal control circuit apparatus 61 (FIG. 3).

A filter/rectifier circuit 153 in connection with the output 151 from the amplifier 148 provides at the terminal 154 a DC signal that represents proper operation of the oscillator 30, phase shift circuit 40 and signal output and switching circuit 140 to derive an AC antenna signal A for coupling at transmitter plate 12 to an antenna 10. Accordingly, the circuit 153 includes a pair of filter capacitors 155, 156, resistors 157, 158, rectifier (diode) 159, output transistor 160, output resistors 161, 162, and zener diode 163. An input potentiometer 164 coupled between the output 151 of amplifier 148 and ground 87 also is at the input of the circuit 153. The circuit 153 provides at the terminal 154 a positive DC signal as long as there is an AC signal produced at terminal 151. If the signal at 151 is a DC signal, the capacitor 155 will block the same to prevent the production of a positive DC signal at terminal 154; also, there will be no signal produced at terminal 154 if there is no signal produced at terminal 151. In operation of the rip detector system 2 as controlled by the computer 26, whenever an antenna 10 is not detected in the conveyor belt 3 where it is expected to be detected, ordinarily before signalling a rip and causing shut down of the conveyor belt system 2, the computer 26 will check the signal level at terminal 154 to confirm whether or not the oscillator 30, etc., are functional to deliver the desired antenna signal A to the transmitter plate 12.

A logic control circuit 170 is coupled by line 171 to the computer 26. The logic control circuit 170 responds to logic 1 or logic 0 signals on line 171 to control the signals on line 141 and, thus, whether or not the signal produced by the oscillator 30 is to be shifted in phase or not by the phase shift circuit 40, and to control a series of analog switches 172 that determine whether or not the test signal T will be produced on line 41T. More specifically, a logic 1 signal received on line 171 causes saturation of control transister 173, which, in turn, causes the inverting amplifiers 174, 175 to produce at their outputs logic 1 and logic 0 signals, respectively. The logic 1 signal on line 141a, causes the phase shift circuit 40 to shift the phase of the signal produced by the oscillator 30 so that the phase of the signal produced on line 142 and, thus, the phase of the antenna signal A delivered to the transmitter probe 12 will be shifted in phase from the reference signal R. Moreover, the logic 0 signal at the output if inverting amplifier 175 makes analog switches 172a, 172b nonconductive so as to block any test signal T from reaching the line 41T. Furthermore, the logic 1 signal at the output of inverting amplifier 174 makes analog switches 172c, 172d conductive, thereby to assure that any signal that may pass either or both of the analog switches 172a, 172b will be conducted through to ground 87.

On the other hand, a logic 0 signal at line 171 from the computer 26 terminates conduction in the control transistor 173, whereupon the inverting amplifier 174 produces a logic 0 on line 141a, and the amplifier 175 produces a logic 1. Such logic 1 signal on line 141a causes the phase shift circuit 40 no longer to shift the phase of the AC signal from the oscillator 30. As a result, the phase of the signal at output line 141 from amplifier 148 now will be the same as the phase as the reference signal produced by the oscillator 30 at line 141R. The signal from line 151 is coupled by the potentiometer 164 to the analog switch circuit 172. The logic 1 signal on line 141b causes the analog switches 172a, 172b to be conductive thereby passing the test signal to line 41T for the test purposes described above with reference to FIG. 3. At the same time, the logic 0 signal on line 141a causes the analog switches 172c, 172d to be nonconductive so as not to interfere with delivery of the test signal to the line 41T.

It is noted that during conduction in the analog switches 172a, 172b, the signal passed through them is derived from the output 151 of the amplifier 148. If there were an adequate transmitter antenna signal at the transmitter probe 12 when a test signal is being delivered to line 41T, when there is no antenna present at the rip detector station, such signal will not be coupled through to the receiver plate 13 or input terminal 60 (FIG. 3), and when there is an antenna so present, the received antenna signal A' would not detrimentally affect the test procedures.

*The potentiometer 164 may be adjusted so the amplitude of the test signal and the received antennae signals will be approximately the same.

A manual test switch 180 may be provided in the signal output and switching circuit 140 for the purpose of effecting a manual control of the test signal production. The switch 180 is shown as a normally open switch connected across the emitter and collector of the control transistor 173. Therefore, if a logic 0 signal were delivered to line 171 causing a logic 1 ordinarily to be produced at the collector of that control transistor and, more particularly, at the input of the inverting amplifier 174, closure of the test switch 180 would eliminate that logic 1 signal to prevent delivery of a test signal T to the line 41T. Alternatively, the switch 180 could be a normally closed switch connected in series with the emitter of the control transistor 173 and ground 87. Therefore, if a logic 1 signal were delivered to the line 171 trying to cause conduction in the control transistor 173, and, thus, a logic 0 at the input to the inverting amplifier 174; opening of such manual test switch could open the conduction path for the transistor 173 thus causing a logic 1 signal to be delivered to the input of the inverting amplifier 174. Of course other combinations of manual test switch also may be used, as desired.

Digital Phase Shift Curcuit

Figure 5:
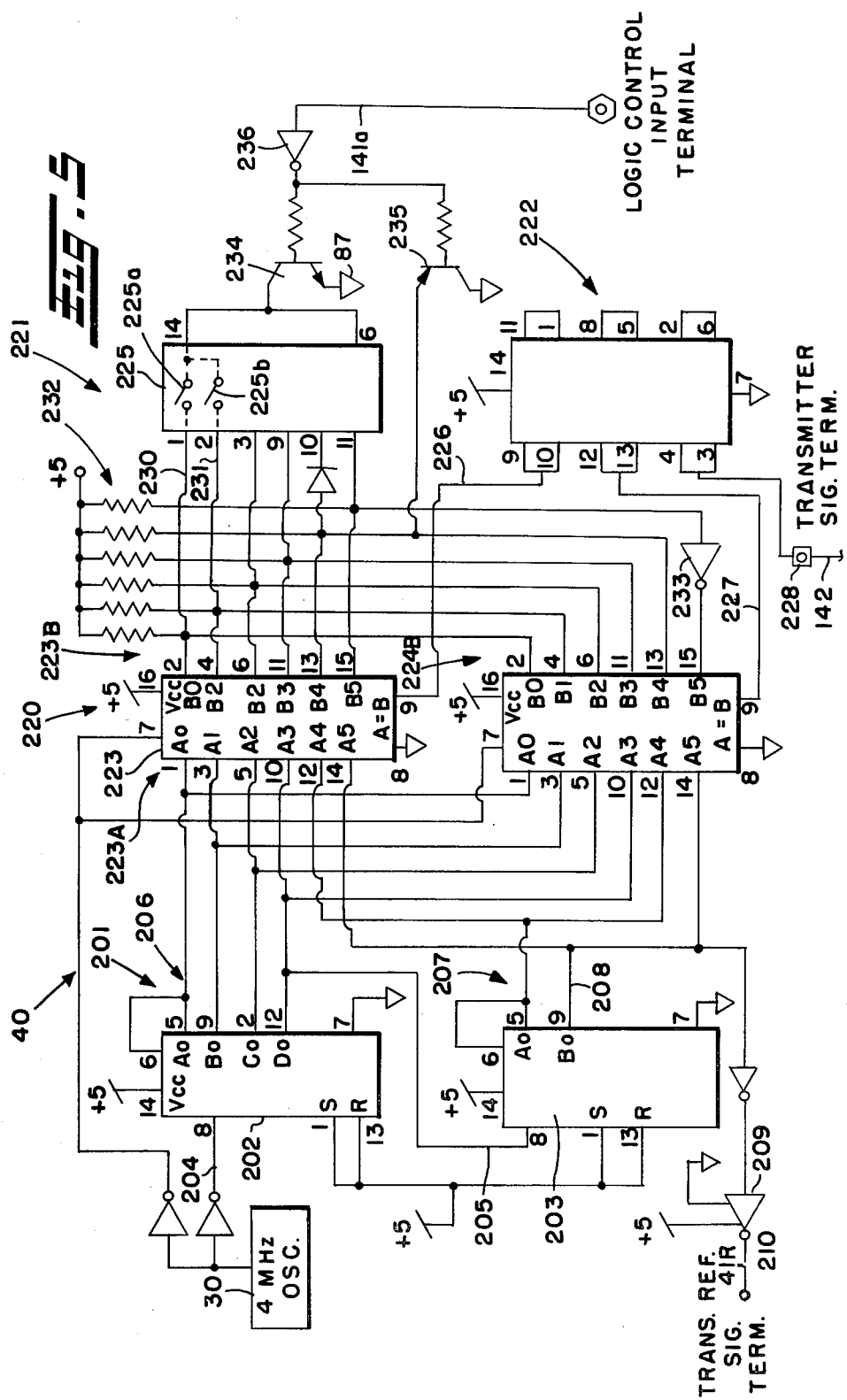
FIG. 5 is a schematic electric circuit diagram of a digital phase shift circuit of the invention.

Referring, now, to FIG. 5, the digital phase shift circuit 40 is shown in detail. Such circuit is intended to develop or to generate from an input AC signal, such as a 4 MHz. signal produced by the conventional oscillator 30, the antenna A, reference R, and test T signals for delivery via lines 41A, 41R and 41T as aforesaid.

To that end, the circuit 40, first of all, includes a frequency divider circuit 201 formed by a pair of binary counters 202, 203, such as integrated circuits model No. N8281A, that count the pulses input to their respective input ports 204, 205 and, accordingly, produce output digital information at their parallel output ports 206, 207. The parallel digital data on the six lines of such output ports 206, 207 represent a time frame representation of the immediate development of the reference signal R. In other words, the instantaneous digital value of the parallel information at such output ports 206, 207 represents how far along in each of its periodic cycles is the reference signal. Such reference signal R is derived from output port 208 of the binary counter 203 and is coupled via inverting amplifier 209 and terminal 210 to line 41R for input to the amplifier 112 (FIG. 3). As it is output from the binary counter 203, the reference signal R is a balanced square wave signal divided by 64 from the 4 MHz. signal of the oscillator 30 so as to have a frequency of 62.5 KHz.

Additionally, the digital phase shift circuit 40 includes a digital phase shifter 220, a phase shift setting device 221, and an output circuit 222. The phase shifter 220 is formed by a pair of digital comparators 223, 224, such as integrated circuits model No. 93S46, and the setting device 221 may include one or more individual thumbwheel switches contained, for example, in a discreet thumbwheel strip switch 225 model No. 2A2110026. The output circuit 222 may be a plurality of NAND gates contained in a single integrated circuit model No. 74LS00 and connected as a latch or set-reset flip-flop.

In response to respective pulses sequentially produced at output lines 226, 227 from the comparators 223, 224 which are coupled to input ports of the output circuit 222, the latter delivers a square wave signal, the transmitter signal, via the transmitter signal terminal 228 to the circuit 140 (FIG. 4) for developing either the antenna signal A or test signal T.

Each of the comparators 223, 224 has six A input ports 223A, 224A connected by respective lines, as is shown in FIG. 5, of the output ports 206, 207 of the counters 202, 203. Each comparator also has six B input ports 223B, 224B connected, as is shown, to respective switch terminals of the setting device 221, such as terminals 230, 231. The B input ports 223B, 224B ordinarily tend to be biased to a 5 volt logic 1 signal level by respective resistors 232. An inverting amplifier 233 assures that the sixth B input port B5 of comparator 224 will be biased to an opposite logic level relative to that of the sixth B input port B5 of the comparator 223. The actual logic level to which each of the B input ports is biased is a function of adjustment and control of the setting device 221. Since the respective A input ports of the two comparators are coupled in parallel and since the respective B input ports are connected in parallel, i.e. except for the noted inversion by amplifier 233, the signals produced on lines 226, 227 will be spaced apart in time by the time required to complete one half of a complete counting cycle of the counter/frequency divider 201. Specifically, when the same parallel digital information is provided at the A and B input ports of a respective comparator, such comparator produces a logic 1 signal at its A=B output terminal, which is coupled to either line 226 or 227.

The phase relation of the signals on lines 226, 227, and, thus of the transmitter signal produced by the output circuit 222 to the reference signal R at terminal 210 depends on the setting device 221. Such setting device 221 further includes phase shift control transistors 234, 235 coupled via buffer/driver inverting amplifier 236 to respond to the signals received from the circuit 170 (FIG. 4) on line 141a. Assuming initially that the transistor 234 is conductive to complete a ground 87 circuit connection for the thumbwheel switches 225, the transistor 235 is non-conductive. Closure, then, of any of the individual thumbwheel switches, e.g. 225a, 225b, etc. in the device 225, will draw to ground reference potential or logic 0 level the B input port to which such switch is connected, thus, changing the count value on the parallel output port lines or bus of the counters 202, 203 that must exist for the respective pulse signals to be produced at the A=B output terminals/lines 226, 227 of the comparators 223, 224. Accordingly, when the phase shift control transistors 234, 235 are conducting and non-conducting, respectively, the phase relation between the transmitter signal delivered to the transmitter signal terminal 228 and the reference signal at terminal 210 will be a direct function of the open or closed setting of the individual thumbwheel switches in the device 225.

By switching the conductive/non-conductive states of the phase shift control transistors 234, 235, e.g. by the computer providing a test oscillator control signal on line 171 (FIG. 4) or manual operation of switch 180, the phase of the transmitter signal produced at terminal 228 can be forced to a predetermined phase relation with respect to the reference signal at terminal 210. Specifically, such forced phase relation most preferably is an in phase relation, whereby the transmitter signal at terminal 228 is used as the test signal T for the above reasons.

When the transistor 234 is non-conductive, each of the B input ports 223B, 224B tends to be pulled up to a logic 1 level via resistors 232, except for the one B input port coupled to the output of the inverting amplifier 233 which tends to be pulled to logic 0. However, the conductive transistor 235 pulls the B4 input ports of each comparator to logic 0, i.e. the ground 87 reference potential, thereby forcing the comparators 223, 224 to produce the pulse signal on line 226 when the A4 input port is at logic 0 and the remaining ones are at logic 1 and the pulse signal at line 227 when the A4 and A5 input ports are at logic 0 and the remaining ones are at logic 1. The collector of transistor 235 or of several respective such transistors, may be connected to respective one or ones of the B input ports, as may be selected, depending on the desired phase relation between the transmitter and reference signal. Preferably a respective diode 240 provides isolation for each line pulled to ground by the transistor or transistors 235.

It will be appreciated that in the preferred embodiment and best mode the reference signal R is produced at the output of the frequency divider 201, specifically at terminal 210, and the transmitter signal from which the antenna signal A is derived is produced via the phase shifter 220 and output circuit 222 at terminal 228.

However, if desired, the terminal 210 (FIG. 5) may be coupled to line 142 (FIG. 4) and the terminal 228 (FIG. 5) coupled to line 41R (FIG. 4), which still accomplishes the aforesaid result of having an antenna signal A and reference signal R that are out of phase, and a test signal T that is in phase with the reference signal R.

During ordinary use of the circuit 40, the thumbwheel switches are adjusted to parallel digital values or condition such that the received antenna signal A' and the reference signal R will be tuned to be in phase in the detector amplifier 32. When a rip appears to be detected, though, the computer 26 causes a signal on line 171 forcing the transmitter and reference signals to be in phase so that the operability of the transmitter, i.e. oscillator 30 and digital phase shift circuit 40 and the circuit of FIG. 4, and the receiver, e.g. the circuit of FIG. 3, can be checked to learn whether there is a fault in the rip detector monitor system 1 or a rip.

Figure 6:
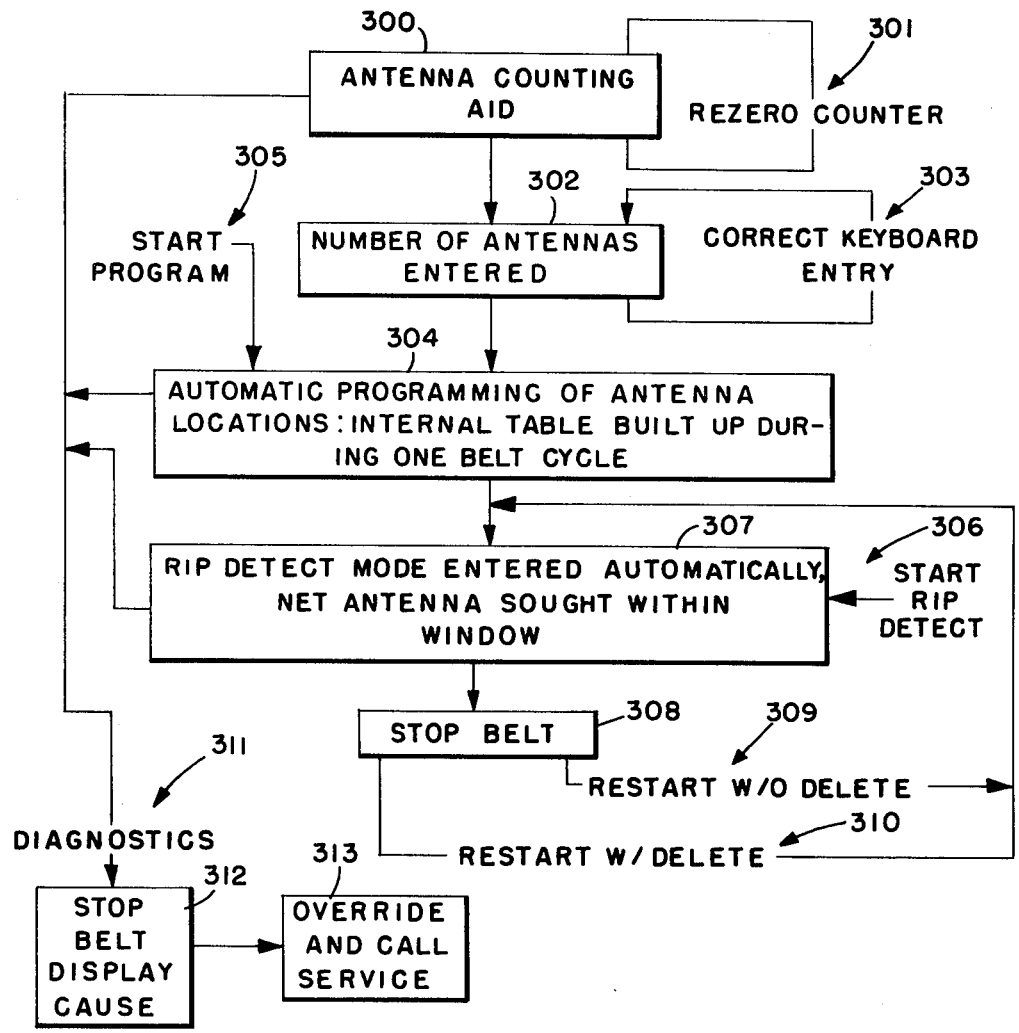
FIG. 6 illustrates a representative flow chart of procedures and steps followed in operation of the overall monitor system.

The several operating modes for the monitor system 1 are depicted in a functional block diagram in FIG. 6. The monitor system 1 may be used as a counting aid for antennas or other events detected by the monitor system, block 300. A user puts a reference mark on the belt 3; enters by user command portion 25 a rezero command for an internal counter in the computer 26 to cause the display 27 to show a zero count value, as represented at 301; and enters an input command to the monitor system 1 to start the conveyor belt system 2, e.g. by closing relay 23. As each whole antenna passes and is counted at the rip detector station 11, the event detect signal on line 34 causes the computer 26 to increment the value shown on the display 27. When the reference mark returns to the rip detector station, the value shown on the display 27 will indicate the number of whole antennas in the belt 3 detectible by the event detector 20. With the number of antennas or other events known, the user may enter that information to the computer 26, box 302, for example by a conventional keyboard, as represented at 303, of the user command portion 25. The user would then enter a command to the computer 26 via the keyboard or other switch, for example, to cause the monitor system to commence operation in the programming mode to build the table of information on the distances between adjacent pairs of antennas. The use of the monitor system 1 as an event counting aid and the just described keyboard entry of events to the monitor system are, however, alternate embodiments to the best mode of the present invention.

In box 304 the automatic programming mode of the antenna locations and the building of the internal table during one belt cycle is presented. According to the best mode of the invention, a user may put a reference mark on the conveyor belt 3 at the rip detect station 11 and enter a start programming command, represented at 305, to start the conveyor belt system to build up the table of relative distance information. When the reference mark returns to the rip detector station 11, the user may enter a start rip detect command signal, represented at 306, for example by a further switch that delivers an appropriate signal to the computer 26, to cause the monitor system 1 automatically to observe the condition of the belt 3 to sense a rip therein. Such rip detect mode of operation is represented at box 307.

As an alternate embodiment to the best mode of the present invention, the computer 26 may be programmed to cause the monitor system 1 automatically to enter the rip detect mode. In this alternate embodiment, the number of antennas would have to be entered, box 302, as aforesaid. The monitor system, then, would automatically build the table of information for that number of antennas; upon completion of the table, the monitor system 1 automatically would enter the rip detect mode, box 307.

During operation of the monitor system 1 in the rip detect mode, according to the information contained in the table, the monitor system 1 will look for each successive antenna at its anticipated position relative to the progress of the belt 3. In order to take into consideration the possibility of slippage, stretching, and the like of the conveyor belt during its operation and life expectancy, as well as other similar inaccuracies in the actual position of the respective antennas, a window of error is permitted preferably on both sides of the anticipated position of each antenna. Therefore, the monitor system 1 will look for an antenna slightly before its expected arrival at the rip detector station 11 and for a brief period after the expected arrival; if no antenna or prescribed number of antennas is detected within the permitted window, the monitor system 1 promptly stops the conveyor belt system 2, as shown at box 308. However, when the monitor system 1 does detect an antenna within an expected window, the actual position of that antenna, as detected by the progress detector 21, relative to the position of the preceding antenna, is input at the appropriate location in the table to update the same, thereby allowing the tabular information to vary gradually within prescribed limits.

Whenever the monitor system 1 shuts down the conveyor belt system 2 due to a missed antenna, the user may restart the conveyor belt system, usually after having visually inspected the belt. As is shown at 309, such restart may be without deleting the information concerning the missed antenna from the table to check, for example, whether the shut-down was due only to an inadvertently broken antenna. If the missed antenna were broken, even though the belt is otherwise intact, the monitor system 1 would shut down the conveyor belt system 2 at the completion of the next cycle. Usually the control for this type of restart operation would be accessible to a user in the field. However, if the monitor system 1 and conveyor belt system 2 were to be restarted with deletion from the table of the information concerning the broken antenna, say, as indicated at 310, then the system would continue operating in rip detect mode without looking for the suspect antenna during the subsequent cycles of operation of the conveyor belt. This latter type of restart operation ordinarily would be accessible only to a qualified serviceman, who would be expected to check the belt 3 and system 1 thoroughly before deleting the information concerning the suspect antenna from the table.

As is shown at 311 in FIG. 6, the diagnostics portion of the monitor system 1 continuously checks various portions of the system to assure proper operation thereof. In the event of a failure being detected by the diagnostics portion, the monitor system 1 will promptly stop the belt and will energize the mode and diagnostic lights indicators portion 24 appropriately to display the reason for shut-down, box 312. Moreover, the monitor system may be overridden manually by the user, box 313, to continue operation of the conveyor belt system 2 without rip detection by the monitor system 1. Ordinarily, such overriding would occur when it is believed that a failure has occurred in the monitor system 1 while the conveyor belt 3 remains intact.

Figure 7:
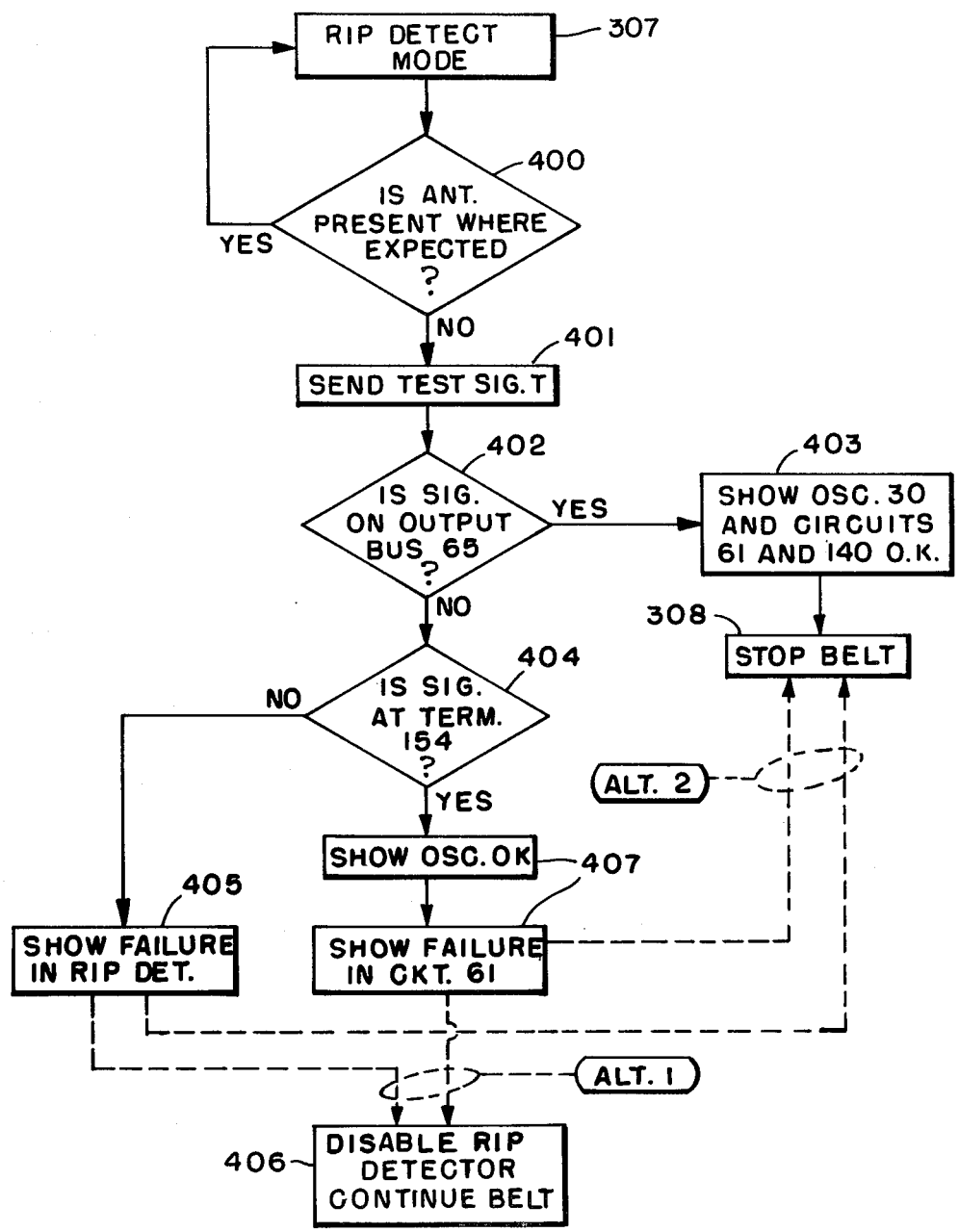
FIG. 7 illustrates a representative flow chart of the normal operation of the diagnostics and belt stopping procedures occurring in the corresponding portions of the overall monitor system, as is described herein.

In accordance with the invention there are several ways in which the test signal T may be used, as is represented in FIG. 7. For example, the test signal may be used to assure that various portions of the circuit apparatus 61 are properly adjusted, as was mentioned above. Additionally, in block 307 and/or block 308 when an antenna is not found where expected (block 400), before stopping the belt the computer 26 may cause a test signal to be delivered to line 41T (block 401). Proper receipt of such test signal as monitored at block 402 so as to cause production of a desired digital signal on the output bus 65 (FIG. 3) will indicate both that the oscillator 30 is operating correctly and that the circuit apparatus 61 and circuit 140 are operating properly (block 403). The computer 26 would then cause shut down of the belt (block 308). On the other hand, if the production of such test signal would not result in a correct digital signal at bus 65, the computer could interpret the same as a failure in the electronics of the monitor system 1 and may function, then, to permit continued operation of the belt 3, although providing an indication to an operator that there is a fault in the rip detector system (block 404, 405 and 406). Furthermore, production of a DC signal at terminal 154 (block 404) indicating that the oscillator 30 is operative, either when a test signal is being delivered to line 41T or when an antenna is present at the rip detector station 11, but there is no proper digital signal produced on the bus 65 would indicate (block 407) that the oscillator is operating but that there is a fault in the circuit apparatus 61 or else in the detector amplifier 32. The sensing of any one of the noted faults also could effect the control of the diagnostics found at locations 311 and 312 in FIG. 6 indicating a failure in the rip detector apparatus and a stopping (block 308), of the belt. The flow chart illustrated in FIG. 7 and the above description may be employed by a person having ordinary skill in the art to construct an appropriate computer language program for operating the computer 26 or the like to carry out the exemplary functions and operations disclosed.

STATEMENT OF INDUSTRIAL APPLICATION

In view of the foregoing, it will be appreciated that the invention may be employed for signal demodulation and detection purposes as well as for facilitating diagnosis of faults, especially these being in connection with conveyor belt rip detector apparatus and methods.

We claim:

1. For use in a conveyor belt rip detector including input and output coupling means for coupling an AC signal to antennas carried by the conveyor belt and for receiving an AC signal transmitted by respective antennas, and detector means for monitoring such AC signals received by said output coupling means and a reference signal to detect the integrity of the conveyor belt, the improvement comprising: a circuit for generating such AC signal and such reference signal which may be relatively shifted in phase by a selected amount, including input means for receiving an AC input signal of a first frequency, frequency divider means for dividing the frequency of such AC input signal to derive a first AC signal, as one of such AC signal and reference signal, at a second frequency smaller than such first frequency, and digital phase shifter means responsive to an output of said frequency divider means for producing a second AC signal, as the other of such AC signal and reference signal, shifted in phase a selected amount from such first AC signal.

2. The invention of claim 1, said input means comprising an AC signal generator.

3. The invention of claim 2, said AC signal generator comprising a sine wave generator.

4. The invention of claim 2, said AC signal generator comprising a triangular wave generator.

5. The invention of claim 1, said frequency divider means comprising a binary counter.

6. The invention of claim 5, said binary counter comprising counting means for counting pulses of such AC input signal and having a parallel digital output; and said digital phase shifter means comprising digital comparator means for comparing parallel digital output information from said binary counter with preselected parallel digital information, said digital comparator means having output means for producing output signals as a function of the comparisons made thereby.

7. The invention of claim 6, further comprising adjustable means for establishing such preselected parallel digital input information as a representation of a preselected phase shift relation between such first and second AC signals.

8. The invention of claim 7, said adjustable means comprising thumbwheel switches.

9. The invention of claim 6, said digital comparator means comprising first means for producing a first pulse in predetermined timed relation to production of a first polarity or magnitude portion of such first AC signal and second means for producing a second pulse in predetermined timed relation to production of a second different polarity or magnitude portion of such first AC signal.

10. The invention of claim 9, further comprising set-reset flip-flop means responsive to such first and second pulses for producing such second AC signal.

11. The invention of claim 1, said digital phase shifter means comprising a digital comparator.

12. The invention of claim 11, said digital phase shifter means further comprising means for setting a parallel digital value at which such second AC signal is produced.

13. The invention of claim 1, said frequency divider means comprising cyclical binary counter means for counting in responsive to such AC input signal to produce parallel digital output information representative of the instantaneous count value thereof, and first output means for deriving such first AC signal as a function of selected count values cyclically achieved by said binary counter means.

14. The invention of claim 13, said digital phase shifter means comprising digital comparator means for comparing such digital output information with preselected digital information.

15. The invention of claim 14, said binary counter comprising counting means for counting pulses of such AC input signal and having a parallel digital output; and said digital phase shifter means comprising digital comparator means for comparing parallel digital output information from said binary counter with preselected parallel digital information, said digital comparator means having output means for producing output signals as a function of the comparisons made thereby.

16. The invention of claim 15, said digital comparator means having two output means for producing respectively one output signal when said binary counter means has counted through one half of its count cycle and a second output signal when said binary counter means has counted through the other half of its counting cycle.

17. The invention of claim 16, said digital comparator means comprising first means for producing a first pulse in predetermined timed relation to production of a first polarity or magnitude portion of such first AC signal and second means for producing a second pulse in predetermined timed relation to production of a second different polarity or magnitude portion of such first AC signal.

18. The invention of claim 15, further comprising means for forcing a predetermined phase relation between such first and second AC signals independently of such preselected phase shift.

19. The invention of claim 18, said adjustable means comprising mens for adjustably biasing parallel inputs to said digital comparator means to selected logic levels representative of such preselected phase shift relation, and said means for forcing comprising means for preventing such biasing and for forcing a predetermined biasing to achieve such predetermined phase shift relation.

* * * * *